United States Patent [19]

Mez

[11] 4,154,547
[45] May 15, 1979

[54] CONNECTION MEMBER FOR THE CONNECTION OF TWO PANELS OF SHEET METAL

[76] Inventor: Georg Mez, Gartenstrasse 30 A, 7416 Gonningen, Fed. Rep. of Germany

[21] Appl. No.: 890,582

[22] Filed: Mar. 20, 1978

[51] Int. Cl.² .............................................. F16B 17/00
[52] U.S. Cl. ................................... 403/403; 403/281; 403/405; 85/37
[58] Field of Search .............. 403/403, 405, 282, 279, 403/281, 247; 29/521, 522; 52/285, 284; 85/37, 38, 39

[56] References Cited

U.S. PATENT DOCUMENTS

| | | | |
|---|---|---|---|
| 3,350,124 | 10/1967 | Husted | 403/410 X |
| 3,511,525 | 5/1970 | Friedling et al. | 403/247 X |
| 3,919,826 | 11/1975 | Mez | 403/403 |

*Primary Examiner*—Andrew V. Kundrat

[57] ABSTRACT

A connecting member for connecting substantially perpendicular sheets of metal has an annular head and a shank with a longitudinal slot extending to a transverse bore. The axis of the transverse bore is at an acute angle to the central plane of the slot. At its maximum, the acute angle forms a point of the wall zone between the end of the slot and the bore which is permanently deformable into the transverse bore by one of the metal sheets guided in the slot.

6 Claims, 6 Drawing Figures

CONNECTION MEMBER FOR THE CONNECTION OF TWO PANELS OF SHEET METAL

The invention relates to a connection member for the connection of two panels of sheet metal standing substantially perpendicularly to one another, having a wide head which has an annularly surrounding edge on its under side and merges into a rotationally symmetrical shank perpendicular to the under side, with a slot of width equal to the sheet metal thickness which extends, starting from the under side of the shank, into a transverse bore provided in the shank, the angle between the central plane of the slot and the geometric longitudinal axis of the transverse bore having a specific value.

Connection members of this kind have become known for example from U.S. Pat. No. 3,919,826 or Austrian Pat. No. 326,456. The one connection member disclosed there, which has a coaxial bore from the head, is operationally excellent and also became a great market success. It is however disadvantageous therein that a special tool similar to a punch is necessary for pressing the zone of the one sheet metal panel, situated in the bore, against the wall of the bore, if the connection is to be unambiguously satisfactory. Furthermore naturally a hammer is required. The extraction force—that is the force with which the connection member can be withdrawn again—depends merely upon to what extent the bent-over zone is held on the bottom slope of the blind bore.

In the second example of embodiment in fact only a hammer and no further tool is needed. This form of embodiment however remained a paper invention because the slot must be offset axially far and thus the shank is split open into two segments of which the one must be substantially thinner than the other and therefore easily bends away. Moreover the sheet metal part deformed approximately to a channel in the transverse bore constitutes a spring element. In fact the extraction force at the end is great here—provided the one shank segment has not deformed. Within the first tenths of a millimetre however the channel acts as a spring and does not in this zone prevent relatively easy withdrawal.

It is the problem of the invention to indicate a connection member of the initially stated kind having the following properties:

(a) The connection member must be simple in production.
(b) The connection member must not be more expensive in material than hitherto.
(c) The connection should be producible with only a hammer. The withdrawal force should be considerably higher than hitherto.

In accordance with the invention this problem is solved by the following features:

(a) The central plane of the slot extends substantially in a radial plane.
(b) The central axis of the transverse bore forms an acute angle with the central plane of the slot.
(c) The acute angle is at maximum so great that the point of that wall zone which remains between the transverse bore and the end of the slot is permanently deformable into the transverse bore by the metal sheet guided in the slot.

Thus one is able to arrange both the slot and the transverse bore symmetrically in relation to the central plane, so that the stress distribution is uniform. Above all, however, the metal sheet bends in the one bore half in the one direction and in the other bore half in the other. As a whole this results in a very rigid deformation body.

Advantageously, the transverse bore passes through the shank. Due to this feature, the transverse bore can be drilled in one single operation, which is cheaper and also results in a better deformation configuration.

The acute angle has a value at which the wall of the slot on the right in the lateral elevation merges with the forward edge of the transverse bore approximately tangentially into the wall of the transverse bore. Due to these features one acheives inter alia a good guidance of the metal sheet in the bore during the deformation operation.

The acute angle has a value at which the wall of the slot on the left in the lateral elevation merges at the forward edge of the transverse bore approximately tangentially into the wall of the transverse bore. Due to these features one obtains and extraordinarily effective point of the wall zone between the end of the slot and the bore. This point, which bends away, becomes a hook which quite considerably increases the extraction force.

The point of the wall zone is in the range of between 0 and 0.4 mm in thickness. Due to these features the object is achieved that the metal sheet can form its path, bending away the point, provided that the usual sheet metal materials and connection member materials are used.

Further advantages and features of the invention appear from the following description of preferred examples of the embodiments.

Figure 1:
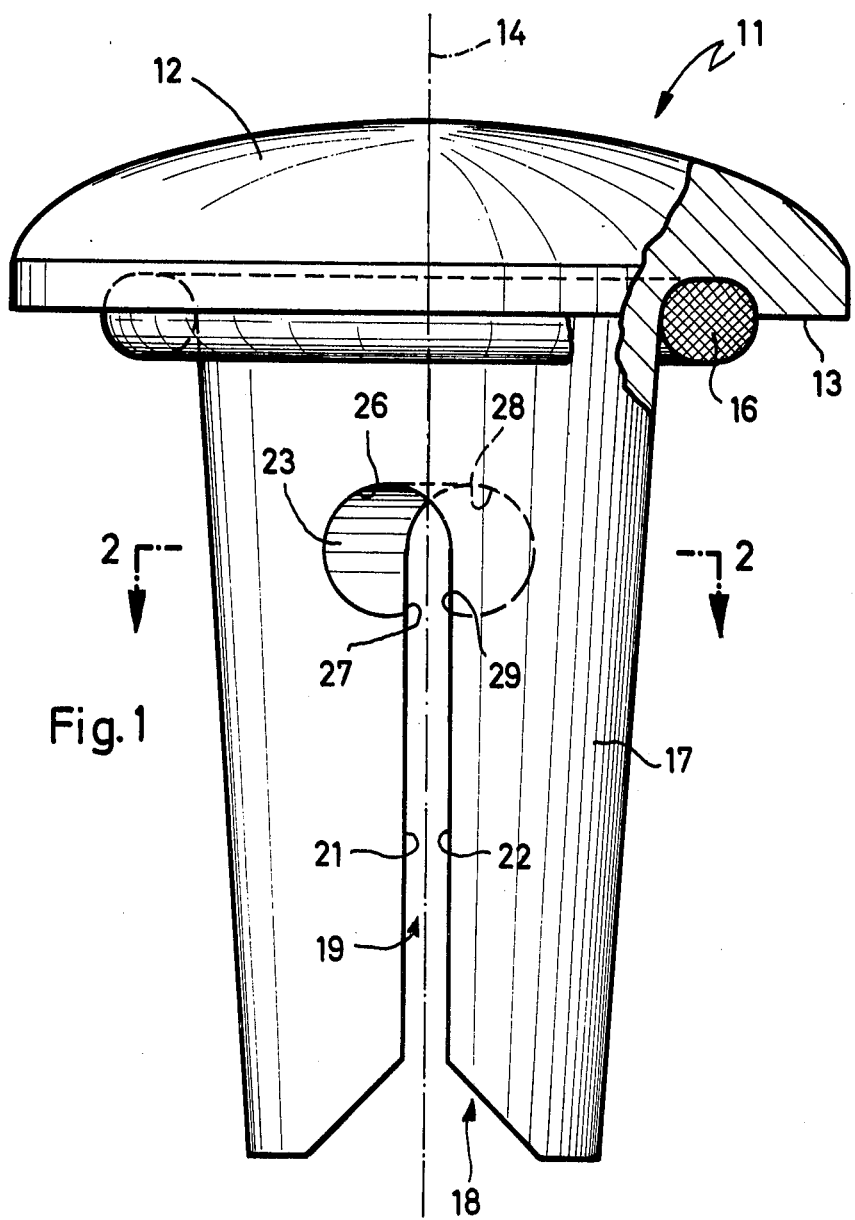
FIG. 1 shows the lateral elevation of a first example of the embodiment, on the scale approximately 1:8.

A connection member 11 consists of drop-forged steel and is between 1½ and 3 cm. in length, preferably about 2 cm. It has a head 12 which is rotationally symmetrical about a geometric longitudinal axis. Its underside 13 is perpendicular to a central plane 14 and is flat in annular form. Beneath it lies an elastic seal member 16 which is illustrated as an O-ring here for the sake of simplicity. From the under side 13 a slightly tapered shank 17 extends coaxially downwards, which shank is rotationally symmetrical about the above-mentioned geometric longitudinal axis. Symmetrically of the central plane 14 a short introduction slot 18 is provided from beneath merging into a slot 19 which likewise is symmetrical about the central plane 14 and has a flat left wall 21 and a wall 22. The slot 19 is little wider than the thickness of the metal sheet to be introduced. The other metal sheet is perpendicular to the central plane 14 and lies against the seal member 16 and has a bore through which the shank 17 can be pushed.

At the end of the slot 19 a circular-cylindrical through-passing bore 23 is provided. Its geometric longitudinal axis 24 is at an acute angle of about 15° to 20°, as shown best by FIG. 2. The geometric longitudinal axis 24 lies in a plane perpendicular to the plane of the drawing in FIG. 1. Moreover according to the drawing the through-passing bore 23 is so arranged that the forward edge 26 of the bore 23 merges on the right tangentially into the forward edge of the wall 22. The forward edge of the wall 21 meets the edge 26 so that a point 27 remains. The diameter of the through-passing bore 23 is about 2 to 2½ times the width of the slot 19.

Figure 2:
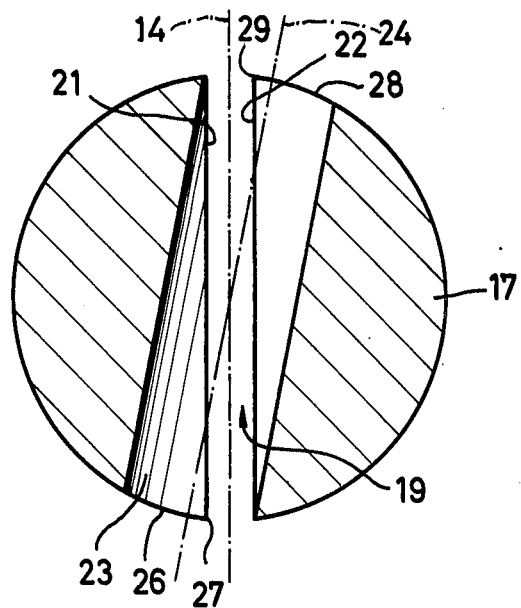
FIG. 2 shows a section along the line 2—2 in FIG. 1.

On account of the acute angle the conditions at the edge 28, to the rear in FIG. 1 and upper in FIG. 2, are exactly converse, that is to say here the wall 21 merges approximately tangentially into the rear edge 28 while the rear edge of the wall 22 forms a point 29 with the edge 28.

When in assembly the head 12 is struck with a hammer, the edges 26, 28 punch away a tab of sheet metal in the zone situated between them, which tab bends according to FIG. 1 along the edge 26 in the counterclockwise direction and along the edge 28 in the clockwise direction, this being the more so the closer to the edge is the zone of the tab.

Figure 3:
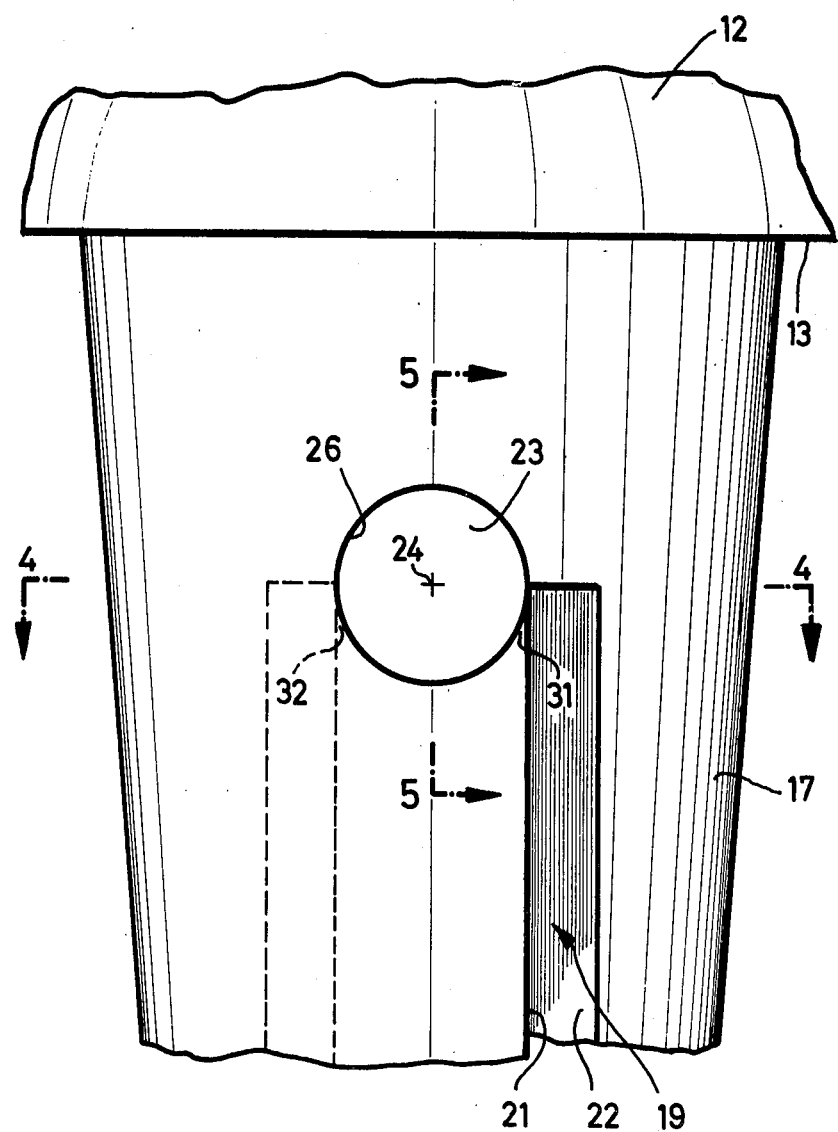
FIG. 3 shows an illustration, further enlarged than FIG. 1, of the zone of the transverse bore and parts broken away thereabove and therebelow.
Figure 4:
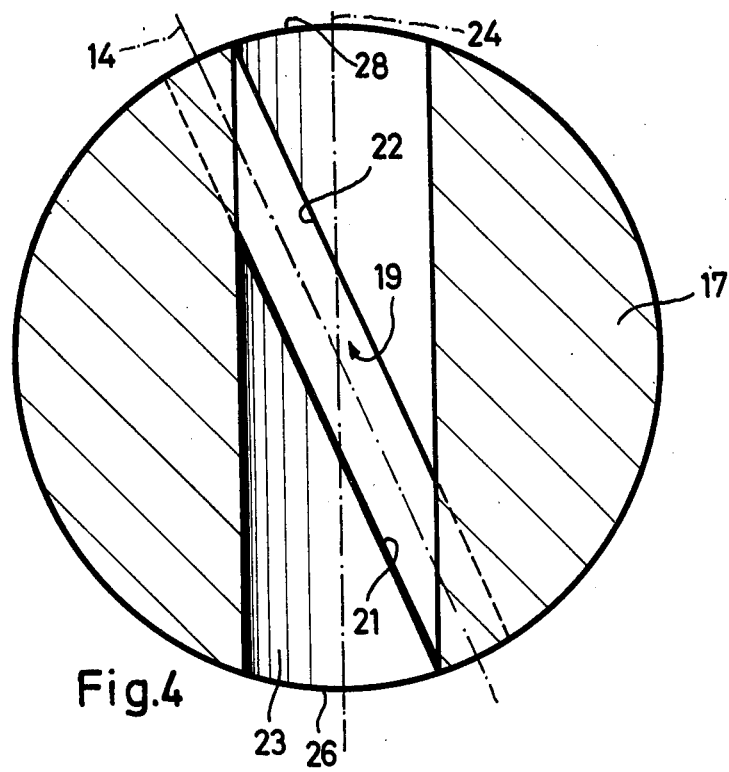
FIG. 4 shows a section along the line 4—4 in FIG. 3.
Figure 5:
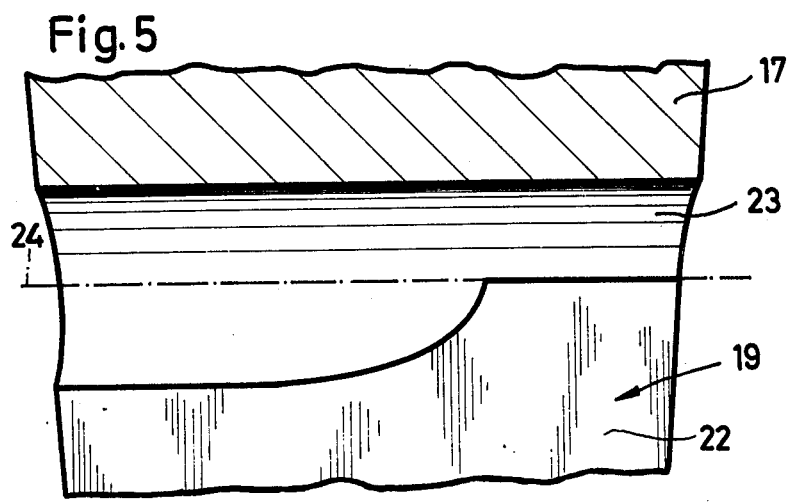
FIG. 5 shows a section along the line 5—5 in FIG. 3.

Still better results are obtained if—as has taken place in FIGS. 3 to 5—the acute angle between the longitudinal axis 24 and the central plane 14 is further increased, namely so far that the forward edge of the left wall 21 merges tangentially into the forward edge 26 and the rear edge of the wall 22 merges tangentially into the rear edge 28. Thus a distinctly sharp point 31 and 32 is produced.

The precise maintenance of the angle, so that really tangential conditions prevail, is not specifically important. If the angle is a few degrees less acute, then for example, the forward edge of the wall 21 forms a secant with the edge 26. If the angle is somewhat more obtuse than illustrated, the forward edge of the wall 21 does not merge at all into the edge 26 and there is no actual point but a material bridge—even though thin.

Thus, there is an intersection between the cylindrical bore 23 and the slot 19. Depending on the angle of intersection, the points of intersection 31, 32 at the surface of the connection members are not so sharp, sharp (as in FIGS. 3 and 4) or finally, a material bridge is present. If in FIG. 4, the plane 14 of the slot 19 would be parallel to the axis 24 of this bore, then there would be no points. The more obtuse this angle becomes, the more acutely the points are generated and finally there is no points at all, but a material bridge. If in FIG. 4, the angle would be even more obtuse than shown, a bridge of metal would physically separate the slot 19 from the bore 23 at the outer surface of the connection member.

Such a material bridge is even advantageous. If in this example of embodiment again for the production of the connection the head 12 is struck, the outer edge of the punched-away sheet metal tab breaks through this material bridge, then as before a point is produced which then has a barb effect. The point 31 and 32 is in every case bent inwards, since the sheet metal has a specific thickness. This effect of the points as securing barbs is very desired.

As known from the prior art, naturally the longitudinal axis 24 must have a specific distance from the under side 13, for the sheet metal must in no case roll up twice in the through-passing bore 23. It is sufficient if the sheet metal bends through less than 180°. Then the metal sheet will in no case describe a circular path, as a result of inherent rigidity.

Figure 6:
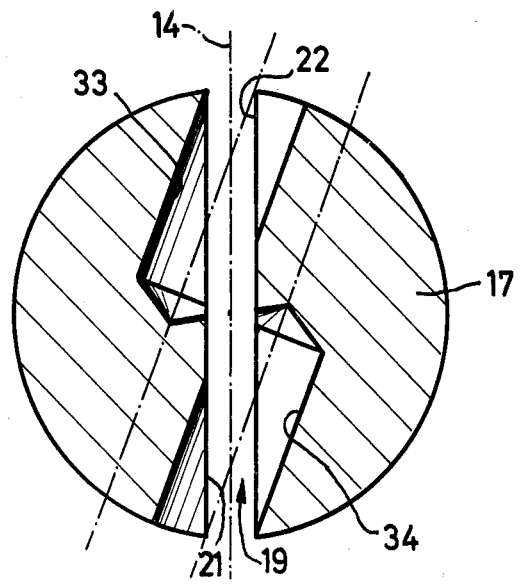
FIG. 6 shows a horizontal section through the transverse bore zone of a third example of the embodiment.

FIG. 6 shows a third example of embodiment. There two anti-parallel blind bores 33, 34 are provided which have a common transition zone in the slot 19. The term 'anti parallel' is taken from vector analysis and means that the blind bores 33, 34 are parallel, but one bore is looking in a direction opposite to the other.

All examples of embodiment have, in addition to the initially stated advantages, the property that they are very airtight. The coaxial longitudinal bore of the known connection member is absent. Moreover the hole for the shank 17 in a metal sheet does not need to be drilled so narrowly that it is smaller than the maximum diameter of the shank. Otherwise a downwardly domed edge occurs on the seam of the hole, having disadvantageous consequences. Rather in the example of embodiment due to the use of a sealing member 16, the bore can be made to fit and if necessary the seal member 16 draws the one metal sheet against the other metal sheet over the last tenth of a millimeter.

What I claim is:

1. Connection member for joining two sheets of metal arranged substantially perpendicular to one another, comprising
    a head having an annular surrounding edge, a rotationally symmetrical shank merging with the underside of said head and having a transverse bore and a slot of a width at least equal to the sheet metal thickness which starts from the underside of said shank and extends to the vicinity of said transverse bore,
    said slot having a central plane which extends in a radial plane,
    said transverse bore having a central axis which forms an acute angle with the central plane of said slot as seen in a plane parallel to said underside of said head,
    said acute angle at maximum being so large that the point of that wall zone which remains between said transverse bore and the end of said slot is permanently deformable into said transverse bore by the metal sheet guided in said slot.

2. Connection member according to claim 1, in which said transverse bore is a through-passing bore.

3. Connection member according to claim 1, in which said acute angle has a value at which the wall of said slot on the right in the lateral elevation merges with the forward edge of said transverse bore approximately tangentially into the wall of said transverse bore.

4. Connection member according to claim 1, in which said acute angle has a value at which the wall of said slot on the left in the lateral elevation merges at the forward edge of said transverse bore approximately tangentially into the wall of said transverse bore.

5. Connection member according to claim 1, in which the point of the wall zone is in the range of between 0 and 0.4 mm in thickness.

6. Connection member according to claim 1, in which said transverse bore comprises two anti-parallel blind bores which are approximately half as long as the diameter of said shank in the area of said transverse bore and the geometric longitudinal axes of which are spaced at a distance from one another.

* * * * *